United States Patent
Mondal et al.

(10) Patent No.: US 8,593,030 B2
(45) Date of Patent: Nov. 26, 2013

(54) ROTATING ELECTRIC MACHINE FOR GENERATING A CONSTANT FREQUENCY AC POWER SUPPLY FROM A VARIABLE SPEED PRIMEMOVER

(76) Inventors: Nikhil Mondal, West Bengal (IN);
Nirmal Kumar Deb, West Bengal (IN);
Sujit Kumar Biswas, West Bengal (IN)

(*) Notice: Subject to any disclaimer, the term of this patent is extended or adjusted under 35 U.S.C. 154(b) by 237 days.

(21) Appl. No.: 13/177,953

(22) Filed: Jul. 7, 2011

(65) Prior Publication Data
US 2012/0007459 A1    Jan. 12, 2012

(30) Foreign Application Priority Data
Jul. 9, 2010    (IN) .............................. 753/KOL/2010

(51) Int. Cl.
*H02K 1/00*    (2006.01)
(52) U.S. Cl.
USPC ......................................... 310/184; 310/180
(58) Field of Classification Search
USPC ................. 310/180, 184, 195, 198, 185, 4 R; 290/4 R
See application file for complete search history.

(56) References Cited

U.S. PATENT DOCUMENTS

| | | | |
|---|---|---|---|
| 4,743,777 A * | 5/1988 | Shilling et al. | 290/46 |
| 4,868,406 A * | 9/1989 | Glennon et al. | 290/4 R |
| 6,462,429 B1 * | 10/2002 | Dhyanchand et al. | 290/31 |
| 2009/0243417 A1 * | 10/2009 | Xu et al. | 310/184 |

* cited by examiner

*Primary Examiner* — Nguyen H Hanh
(74) *Attorney, Agent, or Firm* — The Webb Law Firm

(57) ABSTRACT

Disclosed is a rotating electric machine for generating a constant frequency AC power supply from a variable speed primemover including: a stator wound with two sets of isolated polyphase windings having the same number of poles, with the polyphase windings located at about 90 degree displacement in space between them, and a rotor wound with two sets of isolated polyphase windings having the same number of poles and placed at about 90 degree displacement in space between them. The rotor has two winding terminals interconnected either internally or externally to the machine with mutually reverse phase sequence. When one set of stator winding is energized by an AC power supply of a given frequency and voltage, and the rotor shaft is rotated by an external means in the same direction as that of the rotating field of the stator.

12 Claims, 2 Drawing Sheets

ROTATING ELECTRIC MACHINE FOR GENERATING A CONSTANT FREQUENCY AC POWER SUPPLY FROM A VARIABLE SPEED PRIMEMOVER

FIELD OF INVENTION

The present invention relates to an improved rotating electric machine for generating AC power supply. The invention particularly relates to an improved electric machine for generating a constant frequency AC power supply from a variable speed primemover. The invention includes development of a polyphase Variable Speed Constant Frequency (VSCF) line connected induction generator for converting the mechanical power input from a variable speed primemover into constant frequency electrical active power without using any electronic power converters.

BACKGROUND OF THE INVENTION

It is known that the Variable Speed Constant Frequency (VSCF) induction generators have a potential application for conversion of fluctuating wind energy to a constant frequency active electrical power, which has been made through different methods using VSCF induction generator since early 1970s. Normally, two types of systems are known and are used for achieving constant frequency output or power supply from a variable speed primemover.

In the first system, known as the fixed speed system, the variable speed from the primemover is converted to fixed speed using gear system, which in turn drives the fixed speed generator to yield constant frequency power supply.

In the second system, known as the variable speed system, the generator is directly connected to the variable speed primemover and the generator yields a constant frequency AC power supply through the use of electronic power converters.

In both the systems, the squirrel cage and slip-ring type induction machines are used. The second system has attracted more attention since the complex mechanical gear arrangement can be disposed off, increasing reliability. In the second system however, both types of machines require electronic power converter for generating constant frequency electrical power under varying speed condition of the prime mover. The squirrel cage induction generator requires electronic power converter of 100% rating introduced between electric power grid and generator stator winding while the slip-ring or wound rotor induction generator requires electronic power converter of partial rating introduced between rotor winding and electrical grid, with its stator winding directly connected to the electrical grid. Such a slip-ring machine arrangement is known as a Doubly Fed Induction Generator (DFIG).

The major advantage of DFIG, which is already made popular, is that the electronic power converter has to handle only a fraction (20 to 30%) of the total system power. Recent research and advancement in this area has led to the development of induction machines using two sets of stator winding for converting power from a fluctuating speed primemover to a constant frequency electrical active power, but still retaining the need for electronic power converters. The two separate stator windings were placed in the same slots but wound for two sets of balanced polyphase windings with two different numbers of poles such that the flux created by one set of winding does not interfere with that of the other. One of the windings called as "power winding" is connected to the grid directly while the second winding called as "control winding" is also connected to the grid through an electronic power converter. Thus, existing technology in this area utilizes some form of electronic power converter in association with a type of induction machine to generate fixed frequency active power to the grid, when driven by a variable speed primemover.

In the known machines, due to the incorporation of electronic power converters for generating constant frequency electrical active power from fluctuating speed prime movers, the following problems were experienced:

1. Extra cost: For larger wind turbines of 3 to 4 MW range, the converter rating (around 25%) is quite large, thus increases the cost of converter (its associated transformers and power filters) and associated control circuits which are more complicated. This ultimately increases the cost of energy intended to be produced.
2. Degradation of Power Quality: The electronic power converter injects switching harmonics in the connected grid and degrades the power factor of the bus.
3. System Stability Problem: The converter introduced in DFIG system, often loses control of the rotor current and would ultimately go out of control due to disturbance in power line especially in voltage sag conditions.
4. Reduced Life of the Bearings in the Generator: In DFIG system, the introduced Pulse Width Modulated (PWM) converter damages the bearings of the generator due to the flow of earth current through such bearings, produced by interference created by the converter.
5. Increased Ownership cost: The electronic power converter being an active element is susceptible to damage (particularly due to voltage surges) than any passive element. So the chance of damage is more and ultimately increases the ownership cost and for replacement of the required accessories.
6. Losses in the Converter System: The converter losses in Variable Speed Induction Generator (VSIG) system is around 2.5% of maximum shaft power and the same is around 1% for DFIG system. Additional losses will be incurred in the transformer usually used in existing converter systems.

To overcome the aforesaid disadvantages associated with the prior art machines having electronic power converters in existing systems for achieving constant frequency electrical power from variable speed prime mover, the applicants have developed a simple dual stator and rotor winding induction generator that can produce constant frequency electrical active power even if the speed of the prime mover changes, without using any electronic power converter.

DESCRIPTION OF THE INVENTION

One of the objects of the present invention is to provide a simple but effective dual winding stator and dual winding rotor induction generator, with a view to obviate the hitherto known drawbacks.

Another object of the present invention is to provide an electric machine for generating constant frequency AC power supply from a variable speed primemover which is less cumbersome in construction.

A further object of the present invention is to provide an electric machine for generating constant frequency AC power supply from a variable speed primemover which has less number of expensive component parts and thus economical.

A still further object of the present invention is to achieve an improved rotating electric machine comprising a dual winding stator and dual winding rotor induction generator capable of producing more efficiently a constant frequency electrical active power from variable speed primemover.

One more object of the present invention is to achieve a constant frequency electrical active power from variable speed primemover with much more reliability.

A still one more object of the present invention is to achieve a constant frequency electrical active power from variable speed primemover like a wind turbine, without using any electronic power converter.

The present invention provides an improved rotating electric machine for generating a constant frequency AC power supply from a variable speed primemover comprising a stator wound with two sets of isolated polyphase windings having the same number of poles, said polyphase windings being located at about 90 degree displacement in space between them, a rotor wound with two sets of isolated polyphase windings having same number of poles and are placed at about 90 degree displacement in space between them, said rotor having two winding terminals being interconnected either internally or externally to said machine with mutually reverse phase sequence, wherein the arrangement being such that when one set of stator winding is energized by AC power supply of a given frequency and voltage, and the rotor shaft being rotated by an external means in the same direction as that of the rotating field of said stator, the output from the second set of stator winding has a constant frequency equal to that of the given AC supply, irrespective of the speed of rotation of said rotor shaft within a reasonable range above synchronous speed corresponding to the AC supply provided; said second set of stator winding being connected to load directly or synchronized to the same source of AC supply whereby mechanical power input being directly fed into the AC supply source.

In the above stated improved electric machine for generating constant frequency AC power supply, the said polyphase winding is selected from a two phase or a three phase winding.

Two rotor windings in the improved electric machine of the invention are interconnected inside or outside the said machine.

In the rotor windings in the improved electric machine of the invention, the said primemover is selected from motor, engine or turbine.

An external static electrical transformer with a set of primary and a set of secondary windings is connected between any set of stator winding and the AC supply or load.

The ends of said two isolated stator windings of the new machine are internally connected together to reduce the total number of external terminals for the purpose of feeding mechanical power input into a given AC supply.

In the 3-phase version of this machine, the stator is fitted with two independent sets of balanced three phase windings of same number of poles with about 90° displacement in space between similar phases to avoid the electromagnetic coupling between them. The rotor is also fitted with two independent sets of balanced three phase windings of same number of poles with approximately 90° displacement in space between similar phases and the two rotor windings are interconnected together appropriately at their terminals.

In the above improved machine, when one stator winding is energized from an existing source of balanced three phase fixed frequency AC power supply, for example the grid, a rotating flux is created inside the machine, whose speed of rotation (known as the synchronous speed) is dependent on the supply frequency and the number of poles of the corresponding stator winding. When the rotor of the machine is rotated in the same direction as that of the rotating flux by the externally coupled primemover, currents at slip frequency will be induced into the rotor windings whose corresponding stator was energized. Since this rotor winding is connected to the other rotor winding, this current at slip frequency will also flow through the other rotor winding, creating flux in that winding rotating at slip frequency. Since the complete rotor is rotated externally, the flux from the second rotor winding will now cut its corresponding stator winding and induce currents in that winding. As both the stator windings have same number of poles, the frequency of the voltage generated in the second set of stator winding will be same as that of the first stator winding and thus is independent of the speed of rotation of the primemover. Thus, mechanical power from the primemover is converted into electromagnetic power by the first set of stator-rotor windings and then converted into electrical power by the second set of rotor-stator windings.

The second winding may be connected to the load directly or may be connected back to the existing AC source of fixed frequency power supply, for example the grid. This connection to the grid may be made directly through matching windings with appropriate voltage rating or may be matched through an external transformer. Incidentally, the first winding may also be either connected to the grid directly through matching windings with appropriate voltage rating or may be matched through an external transformer. When the proposed dual stator and rotor winding induction generator is thus connected to the existing grid or any other existing source of fixed frequency electrical power supply, the mechanical power from variable speed primemover like wind turbine, is fed back to the electrical grid as electrical active power with same frequency as that of the grid at synchronized condition.

DESCRIPTION OF THE DRAWINGS

The present invention is described herein below in detail with reference to the accompanying drawings wherein—

DESCRIPTION OF THE PREFERRED EMBODIMENT(S)

Figure 1:
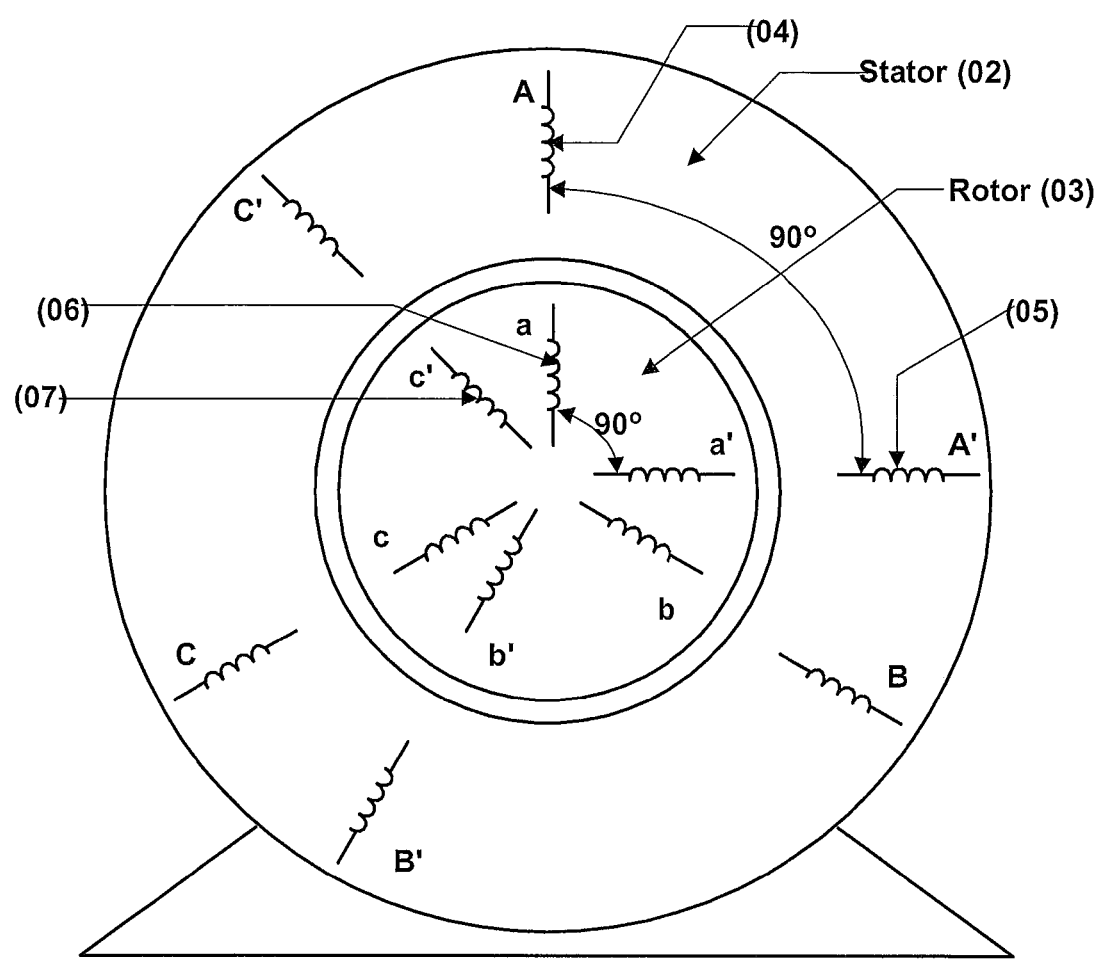
FIG. 1 shows placement of windings in the stator and the rotor.

FIG. 1 illustrates a first set of stator coils (04) comprising A, B and C from one set of three-phase winding. Second set of stator coils (05) comprising A', B' and C' from another isolated set of three-phase winding, displaced by about 90° from the first set. Similarly, a first set of rotor coils (06) comprising a, b and c from one set of three-phase winding while a second set of rotor coils (07) comprising a', b' and c' from another isolated set of three-phase winding, displaced by about 90° from the first set of rotor coils (07).

Figure 2:
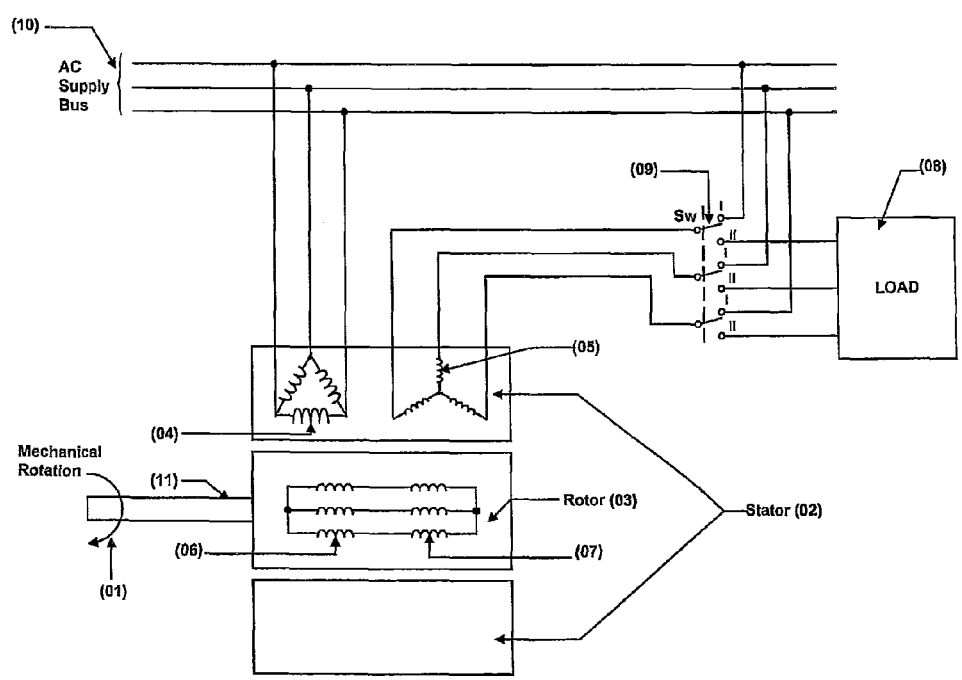
FIG. 2 shows connection of windings to AC bus and/or load.

FIG. 2 illustrates a switch Sw (09) that feeds load directly in position (II) while it sends power back to the three-phase AC bus in position (I).

In the existing technology where electronic power converters are used, the ac supply bus is usually of lower voltage (e.g. 400 V), derived from the higher voltage bus (e.g. 11 kV or 33 kV) connected through a transformer, and since the electronic control devices is not usually compatible for use with higher voltage bus. Thus, the use of a transformer is essential along with switchgear of very high current rating on the low voltage bus. In the scheme described in this specification, the machine can be designed with only three terminals for direct interface with the high voltage bus, dispensing with the need for the converter, transformer and low voltage (high current) switchgear. The absence of converter removes the problem of earth current flow through machine bearings. Thus, the overall cost is reduced; further the efficiency and reliability of the system are improved.

The advantages of the improved machine of the present invention are summarized and stated herein below:
1. Overall cost of the new generator system is substantially lower compared to existing machines.
2. The new generator system is more efficient compared to the existing solutions.
3. The new generator system requires less maintenance cost due to the absence of the electronic power converters.
4. The new machine will hardly inject any harmonic into the main AC supply thereby improving the power factor of the system.
5. The new generator system is less susceptible to line voltage surges and stability problems and can quickly recover from disturbance like voltage sag, fault etc. that might take place in power line.
6. The new machine is not subjected to pre-mature bearing failure due to earth currents.

It will be appreciated that the improved rotating electric machine for generating constant frequency AC power supply from a variable speed primemover as described herein above and as illustrated in the accompanying drawings may have many variables and modifications without deviating from the scope and spirit of this invention; all such modifications and variations as would be known to a person skilled in the art are intended to be covered within the scope of the present invention.

We claim:

1. A rotating electric machine for generating a constant frequency AC power supply from a variable speed primemover comprising: a stator wound with two sets of isolated polyphase windings having the same number of poles, said polyphase windings located at about 90 degree displacement in space between them, a rotor wound with two sets of isolated polyphase windings having the same number of poles and placed at about 90 degree displacement in space between them, said rotor having two winding terminals interconnected either internally or externally to said machine with mutually reverse phase sequence, wherein when one set of stator winding is energized by an AC power supply of a given frequency and voltage, and the rotor shaft is rotated by an external means in the same direction as that of the rotating field of the said stator, the output from the second set of stator winding has a constant frequency equal to that of the given AC supply, irrespective of the speed of rotation of said rotor shaft within a reasonable range above synchronous speed corresponding to the AC supply provided; with said second set of stator winding connected to load directly or synchronized to the same source of AC supply whereby mechanical power input is directly fed into the AC supply source.

2. The rotating electric machine as claimed in claim 1, wherein said primemover is selected from motor, engine or turbine.

3. The rotating electric machine as claimed in claim 2, wherein said second set of stator winding is connected directly to load or synchronized to said source of AC supply.

4. The rotating electric machine as claimed in claim 3, wherein said rotor shaft is rotated by an electric motor.

5. The rotating electric machine as claimed in claim 2, wherein said rotor shaft is rotated by an electric motor.

6. The rotating electric machine as claimed in claim 2, wherein two ends of said isolated stator windings are internally connected to reduce the total number of external terminals for the purpose of feeding mechanical power input into the given AC supply.

7. The rotating electric machine as claimed in claim 1, wherein said second set of stator winding is connected directly to load or synchronized to said source of AC supply.

8. The rotating electric machine as claimed in claim 7, wherein said rotor shaft is rotated by an electric motor.

9. The rotating electric machine as claimed in claim 7, wherein two ends of said isolated stator windings are internally connected to reduce the total number of external terminals for the purpose of feeding mechanical power input into the given AC supply.

10. The rotating electric machine as claimed in claim 1, wherein said rotor shaft is rotated by an electric motor.

11. The rotating electric machine as claimed in claim 10, wherein two ends of said isolated stator windings are internally connected to reduce the total number of external terminals for the purpose of feeding mechanical power input into the given AC supply.

12. The rotating electric machine as claimed in claim 1, wherein two ends of said isolated stator windings are internally connected to reduce the total number of external terminals for the purpose of feeding mechanical power input into the given AC supply.

* * * * *